United States Patent [19]
Nishiwaki et al.

[11] Patent Number: 5,495,462
[45] Date of Patent: Feb. 27, 1996

[54] LIGHT BEAM SPLITTING APPARATUS

[75] Inventors: Seiji Nishiwaki, Osaka; Tetsuo Kitagawa, Moriguchi; Junichi Asada, Ibaraki; Kiyoko Ooshima, Shijyounawate, all of Japan

[73] Assignee: Matsushita Electric Industrial Co., Ltd., Osaka, Japan

[21] Appl. No.: 258,203

[22] Filed: Jun. 10, 1994

[30] Foreign Application Priority Data

Jun. 18, 1993 [JP] Japan ................................ 5-147335
Dec. 21, 1993 [JP] Japan ................................ 5-321676

[51] Int. Cl.⁶ ........................................ G11B 7/00
[52] U.S. Cl. ................ 369/109; 369/112; 369/44.12; 385/29; 385/37
[58] Field of Search ................. 369/109, 110, 369/111, 112, 44.12; 385/28, 29, 36, 37

[56] References Cited

U.S. PATENT DOCUMENTS 3,617,109 11/1971 Tien ........................................ 385/29
5,200,939 4/1993 Nishiwaki et al. .................. 369/44.12
5,208,800 5/1993 Isobe et al. ............................ 369/112
5,247,506 9/1993 Sugiura ................................ 369/110

FOREIGN PATENT DOCUMENTS

3-230106 10/1991 Japan .

Primary Examiner—Loha Ben
Attorney, Agent, or Firm—Fish & Richardson

[57] ABSTRACT

When a laser beam enters into a grating coupler at a right angle, a guided wave with a wave mode corresponding to an incident angle can be generated. Although the guided wave is a light beam in single mode, the waveguide mode is deflected by passing through a step-wise structure and is converted into several guided waves having several modes. When the guided waves are radiated from a straight output grating coupler, the radiant angle is dependent upon the waveguide mode, so beams are radiated in different directions according to their respective waveguide modes. Therefore, a guided wave in zero-order mode outputs a radiant beam having a larger radiant angle, while a guided wave in first-order mode outputs a radiant beam having a smaller radiant angle.

16 Claims, 8 Drawing Sheets

LIGHT BEAM SPLITTING APPARATUS

FIELD OF THE INVENTION

The present invention relates to a light beam splitting apparatus which catches the diverged light beams radiated from a waveguide, and further relates to an optical disk apparatus which converges a light beam for the purpose of recording and reproducing its signal.

BACKGROUND OF THE INVENTION

Figure 8:
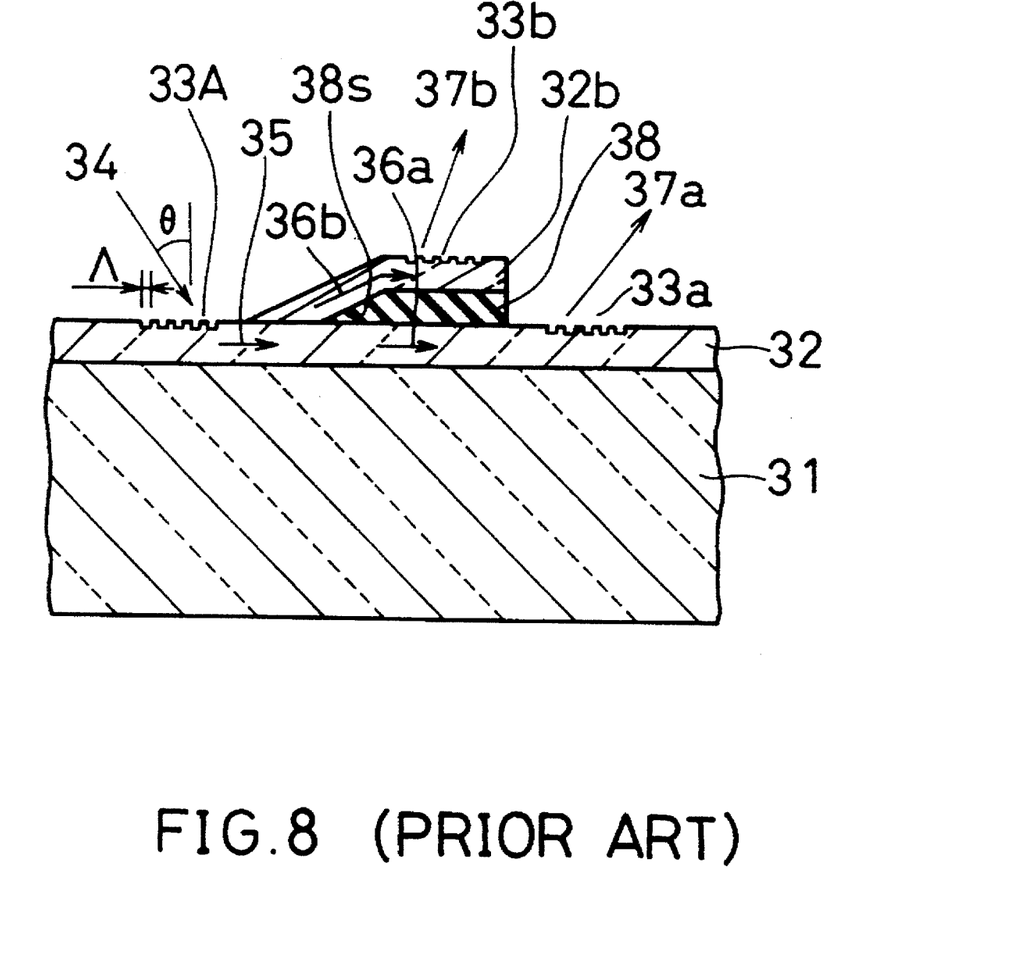
FIG. 8 is a cross-sectional view showing a light beam splitting apparatus of prior art disposed on a waveguide layer.

Generally, divergence of a light beam in free space can be attained easily by combining a mirror and a prism. A light beam (guided light) can be diverged in the same way by applying an optical waveguide layer which has been eagerly studied lately. For example, FIG. 8 illustrates a structure of an optical waveguide layer disposed on a conventional light beam splitting apparatus. In FIG. 8, numeral 31 denotes a transparent substrate; 32, a waveguide layer; 32b, a branched waveguide layer; 33A, a straight input grating coupler formed of an equal straight grating pattern; 33a and 33b, straight output grating couplers formed of an equal straight grating pattern; and 38, a buffer layer. When a laser beam 34 enters into the grating coupler 33A at a right angle, a guided wave 35 with a wave mode corresponding to the incident angle can be generated. The incident angle θ can be provided according to the formula 1:

$$\sin\theta = N - \lambda/\Lambda \qquad \text{(Formula 1)}$$

where N is an equivalent refraction index of the guided wave 35, Λ is a pitch of the grating coupler 33A and λ is a wave length of the laser beam 34. The guided wave 35 can be diverged efficiently through a waveguide layer 32b which is formed on the buffer layer 38 having a gentle taper portion 38s. Thus, the guided wave 35 is divided into two beams, namely 36a, which remains in the waveguide layer 32, and 36b, which moves through the waveguide layer 32b. The guided waves splitting as 36a and 36b, via the grating couplers 33a and 33b, turn respectively into the radiant beams 37a and 37b whose directions are determined by the formula 1.

However, the conventional light beam splitting apparatus had the following problems:

First of all, the structure itself becomes complicated, since it is necessary to dispose the buffer layer 38, the branched waveguide layer 32b and the straight output grating coupler 33b and so forth to diverge the light beam. The second problem is the difficulty with which the taper portion 38s is produced. In other words, in order to generate the guided wave 36b which moves forward to the waveguide layer 32b effectively, the taper portion 38s should have a gentle slope (a small taper ratio); for example, the ratio must be below 1:20. It is impossible to achieve a small ratio like this by applying conventional etching methods, and there is no other appropriate processing method at the moment.

SUMMARY OF THE INVENTION

It is the objective of the present invention to provide a light beam splitting apparatus which can be produced easily through an etching method, which has a simple structure, and which can diverge a light beam effectively. The invention also relates to a new optical disk apparatus applying the above-noted light beam splitting apparatus.

In order to accomplish this objective, this invention includes a light beam splitting apparatus using a laser light source and comprising a transparent waveguide layer, an input medium which guides the laser beam radiated from the laser light source into the waveguide layer and generates the first guided wave transmitted through the waveguide layer, and an output medium which radiates the guided wave transmitted through the waveguide layer toward the outside. The above-noted waveguide layer is actually step-wise bent between the input and the output media. A part of the first guided wave changes to a second guided wave having a different wave mode by passing through this step region. Thus, the two guided waves will be radiated from the output medium in two different directions.

It is preferable in this invention that the differential height of the step structure ranges between 30 to 60% of the thickness of the waveguide layer.

It is preferable in this invention that a buffer layer be formed upon a substrate having a step-wise structure on the surface, and that the waveguide layer be formed on this buffer layer, to form a gentle slope in the step-wise structure.

It is preferable in this invention that the output medium be formed in a periodic structure at a boundary face of the waveguide layer.

It is preferable in this invention that the output medium be formed of a triangular prism placed adjacent to the waveguide layer.

It is preferable in this invention that the light beam radiated from the output medium is focused and reflected at a signal plane of an optical disk apparatus. The reflected beam enters into the output medium and generates a third guided wave transmitted through the waveguide layer toward the input medium. The third guided wave is radiated from the input medium outside of the waveguide layer. An optical detector is placed outside of the waveguide layer to detect the radiant beam.

It is preferable in this invention that the laser beam enter the input medium vertically and the input medium, the stepwise structure and the output medium are formed in rotational symmetry about an optical axis, to form an optical disk apparatus.

It is preferable in this invention that a guided wave generated at the input medium be defined as a beam in first-order mode, and that an optical detector be placed in the direction where an incident beam generates a beam in zero-order mode.

It is preferable in this invention that an optical detecting medium be shaped either as a fan or as an annulus ring about an incident axis, and that the optical detecting medium is symmetrically cut into an inside field and an outside field by a circle about the incident axis. A differential light quantity detected on the inside and outside fields is used to determine a focus error at the signal plane of the optical disk.

Further, this invention relates to a light beam splitting apparatus for use with a laser light source, comprising a transparent waveguide layer, a second transparent layer adjoining the waveguide layer, an input medium which guides a laser beam radiated from a laser light source into the waveguide layer and generates a first guided wave transmitted through the waveguide layer, and an output medium which radiates the guided wave transmitted through the waveguide layer toward the outside. A terminal portion of the second transparent layer is formed between the input and the output media. A part of the first guided wave changes to a second guided wave having a different wave mode by passing adjacent to the terminal portion. Thus, the first and second guided waves will be radiated from the output medium in two different directions.

It is preferable in this invention that the output medium be formed in a periodic uneven structure at a boundary face of the waveguide layer.

It is preferable in this invention that the output medium be formed of a triangular prism placed adjacent to the waveguide layer.

It is preferable in this invention that the output medium is formed in a periodic uneven structure at a boundary face of the waveguide layer, and that a light beam radiated from the output medium is focused and reflected at a signal plane of an optical disk apparatus. The reflected beam enters into the output medium and generates a third guided wave which is transmitted through the waveguide layer toward the input medium. The guided wave is radiated from the input medium outside of the waveguide layer. An optical detector is placed outside of the waveguide layer to detect the radiant beam.

It is preferable in this invention that the laser beam enter the input medium vertically. The input medium, the stepwise structure and the output medium are formed in rotational symmetry about an optical axis, to form an optical disk apparatus.

It is preferable in this invention that a guided wave generated at the input medium be defined as a beam in first-order mode, and that an optical detector be placed in the direction where an incident beam generates a beam in zero-order mode.

It is preferable in this invention that an optical detecting medium be shaped either as a fan or as an annulus ring about an incident axis, and that the optical detecting medium is symmetrically cut into an inside field and an outside field by a circle about the incident axis. A differential light quantity detected at the inside and outside fields is used to determine a focus error at the signal plane of the optical disk.

DETAILED DESCRIPTION OF THE INVENTION

The invention is specifically described by referring to the figures.

EXAMPLE 1

Figure 1:
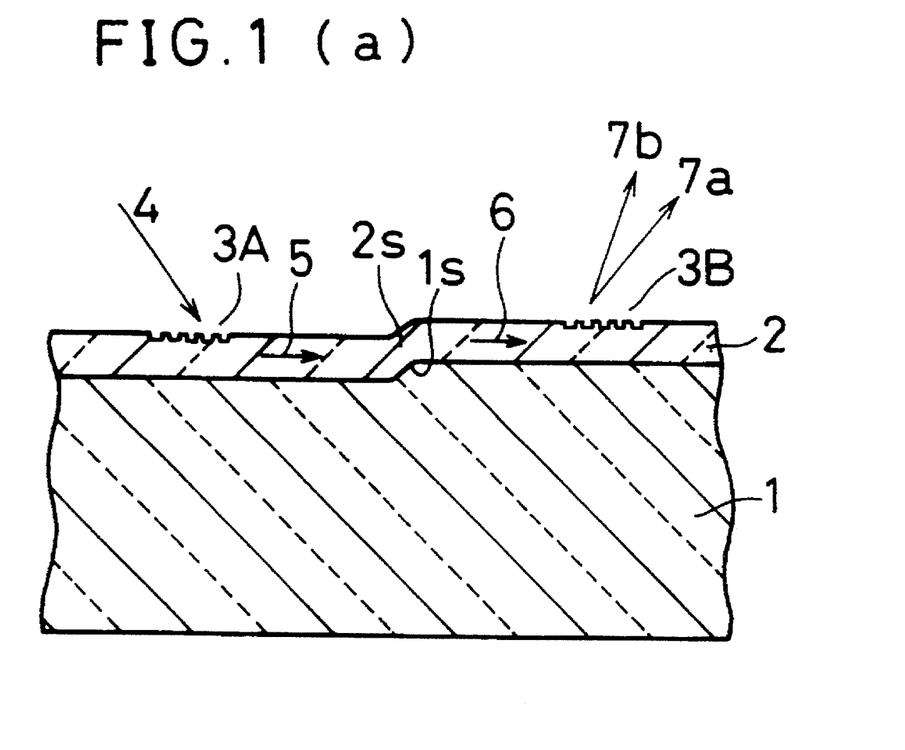
FIG. 1(a) is a cross-sectional view showing a light beam splitting apparatus according to a first embodiment of the present invention.
FIG. 1(b) is a drawing explaining a mode transfer of a guided wave according to the first embodiment of the present invention.
Figure 2:
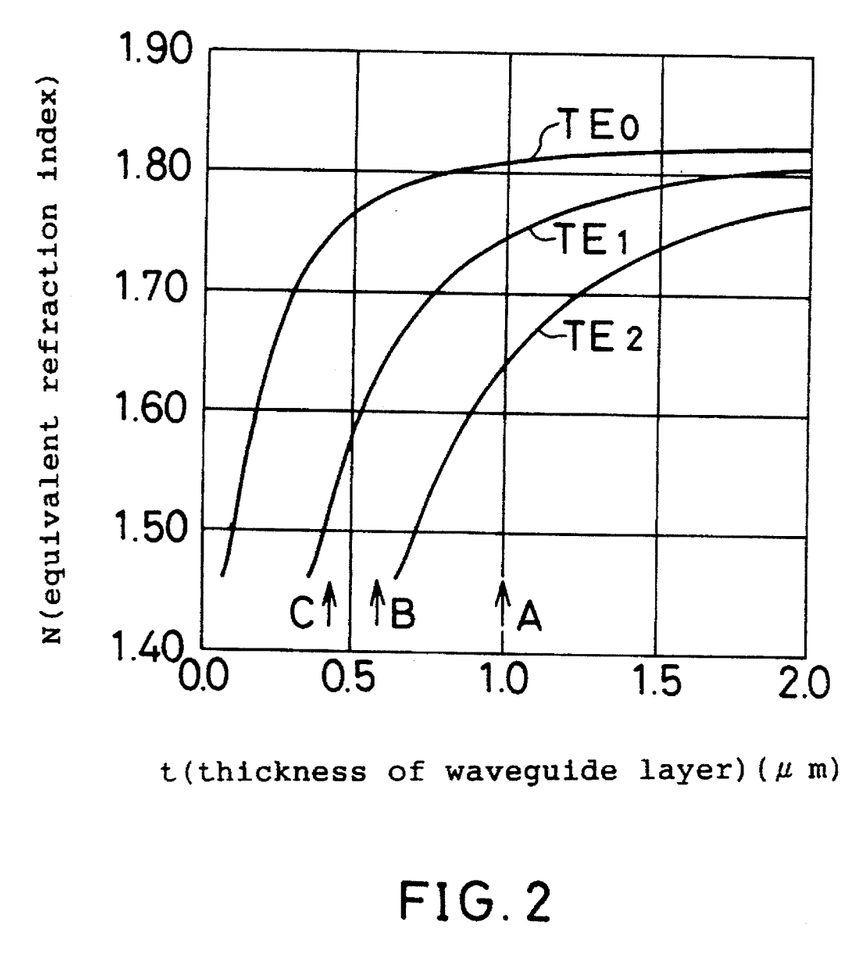
FIG. 2 is a diagram illustrating dispersion properties of a waveguide layer according to the first embodiment of the present invention.

FIG. 1(a) shows the structure of a light beam splitting apparatus according to a first embodiment of the present invention. FIG. 1(b) is an example showing how a waveguide mode changes by passing through the step-wise structure 2s. Referring to FIGS. 1(a) and (b), reference numeral 1 denotes a transparent substrate such as glass or quartz; 2, a waveguide layer such as SiON, SiN and TaO; 3A, a straight input grating coupler formed of an equal-pitched straight grating pattern; 3B, a straight output grating coupler formed of an equal-pitched straight grating pattern; is, a step-wise structure formed on the surface of the transparent substrate 1 by using a method such as etching. Numeral 4 denotes a laser beam; 5 and 6, guided waves; 5a, a guided wave in single mode; 6a, a guided wave in zero-order mode; 6b, a guided wave in first-order mode. 7a is a radiant beam having a large radiant angle, and 7b is a radiant beam having a small radiant angle. The step-wise structure (structure showing the differential) 1s is formed between the grating couplers 3A and 3B, and therefore, the waveguide layer 2 is also bent step-wise forming the slope 2s. When the laser beam 4 enters into the grating coupler 3A at a specific angle, the guided wave 5 with a wave mode corresponding to an incident angle can be generated (according to the formula 1). Although the guided wave 5 is a light beam in single mode, the waveguide mode is deflected by passing through 2s (a mode transfer) and turns into the guided wave 6 including several modes. In FIG. 1(b), the guided wave 5a in single mode (zero-order mode in this case) turns into the guided wave having both zero-order mode and first-order mode (6a and 6b respectively). Naturally, the guided wave 5a or the guided waves 6a and 6b may well be in other mode, from the above-mentioned case. Since there are no specific conditions imposed regarding the form of the step-wise structure 1s, it can be processed easily by using a conventional etching method. In FIG. 1, when the guided waves 6 (6a, 6b) are radiated from the straight output grating coupler 3B, the radiant angles are dependent upon the waveguide modes, thereby radiating in two different directions according to each mode. In other words, a difference in waveguide mode appears as a difference of equivalent refraction index. FIG. 2 shows the dispersion properties (relation between a thickness t of the waveguide layer 2 and an equivalent refraction index) of the guided wave in TE mode according to FIG. 1, whereby modal orders are shown as the parameter. It shows that the equivalent refraction index in zero-order mode is larger than that of first-order mode at the same thickness t. As a result, a radiant angle for each guided wave mode differs according to Formula 1. For instance, the guided wave 6a in zero-order mode outputs a radiant beam 7a having a larger radiant angle, while the guided wave 6b in first-order mode outputs a radiant beam 7b having a smaller radiant angle.

It is possible to determine a quantity ratio of a guided wave in each mode by measuring and comparing the quantity of each radiant beam. Assuming that the thickness of layer t is fixed (t=1.0 μm) and the differential height h serves as the parameter in FIG. 1, Table 1 shows the result of an experiment measuring the quantity ratio of each beam radiated after the mode transformation. The mode for the guided wave 5 is chosen by adjusting the angle of the input beam 4 in which a S-wave is used as an input beam in order to generate the TE-mode (P-wave can also be used to generate TM-mode).

TABLE 1

| guided wave 5 | radiant beam | difference h/t | | |
|---|---|---|---|---|
| | | 0.3 | 0.4 | 0.5 |
| TE zero-order mode | zero-order mode | 79% | 23% | 84% |
| | first-order mode | 20% | 45% | 14% |
| | secondary mode | 1% | 32% | 2% |
| TE first-order mode | zero-order mode | 8% | 34% | 20% |
| | first-order mode | 87% | 44% | 72% |
| | secondary mode | 5% | 22% | 8% |

Table 1 shows that the guided waves are most effectively transferred to other modes when the differential h/t is 0.4.

Assuming that the differential h/t is fixed (h=0.4 t) and the thickness of layer t serves as the parameter in FIG. 1, Table 2 shows the result of the experiment measuring the quantity ratio of each beam radiated after the mode transformation. Thicknesses t of 1.0, 0.6, and 0.42 μm are chosen (corresponding to the arrows A, B, C in FIG. 3); the refraction index of the waveguide layer 2 is 1.85; the refraction index of a transparent substrate (substrate made of quartz) is 1.46; the wavelength of the guided wave (He-Ne laser beam) is 0.6328 μm. Table 2 shows that the guided waves are transferred to all existing modes with almost equal probability when the layer is thick (when near A), while high-order modes tend to be transferred to low-order modes (basic mode) and basic modes tend to remain basic mode when the layer is thin (when near C). This tendency becomes more notable when it becomes closer to the cut-off of TE first-order mode (when near C).

TABLE 2

| guided wave 5 | radiant beam | A | B | C |
|---|---|---|---|---|
| TE zero-order mode | zero-order mode | 23% | 76% | 81% |
| | first-order mode | 45% | 24% | 19% |
| | secondary mode | 32% | — | — |
| TE first-order mode | zero-order mode | 34% | 75% | 96% |
| | first-order mode | 44% | 25% | 4% |
| | secondary mode | 22% | — | — |

In this way, the effective mode transfers can be attained by setting the differential h/t adjacent to 0.4 in the first embodiment of the present invention. Furthermore, the effect of the mode transformation (transfer of zero-order to zero-order mode, transfer of first-order to zero-order mode) can be strengthened by setting the thickness of the layer adjacent to the cut-off of the first-order mode. The differential angles of the step-wise structures is and 2s can range optionally between 1 degree to 90 degrees. One example of the lowest differential angle was the height in a vertical direction=0.5 μm and the length in a horizontal direction=10~20 μm, which turned out to be still effective.

Figure 3:
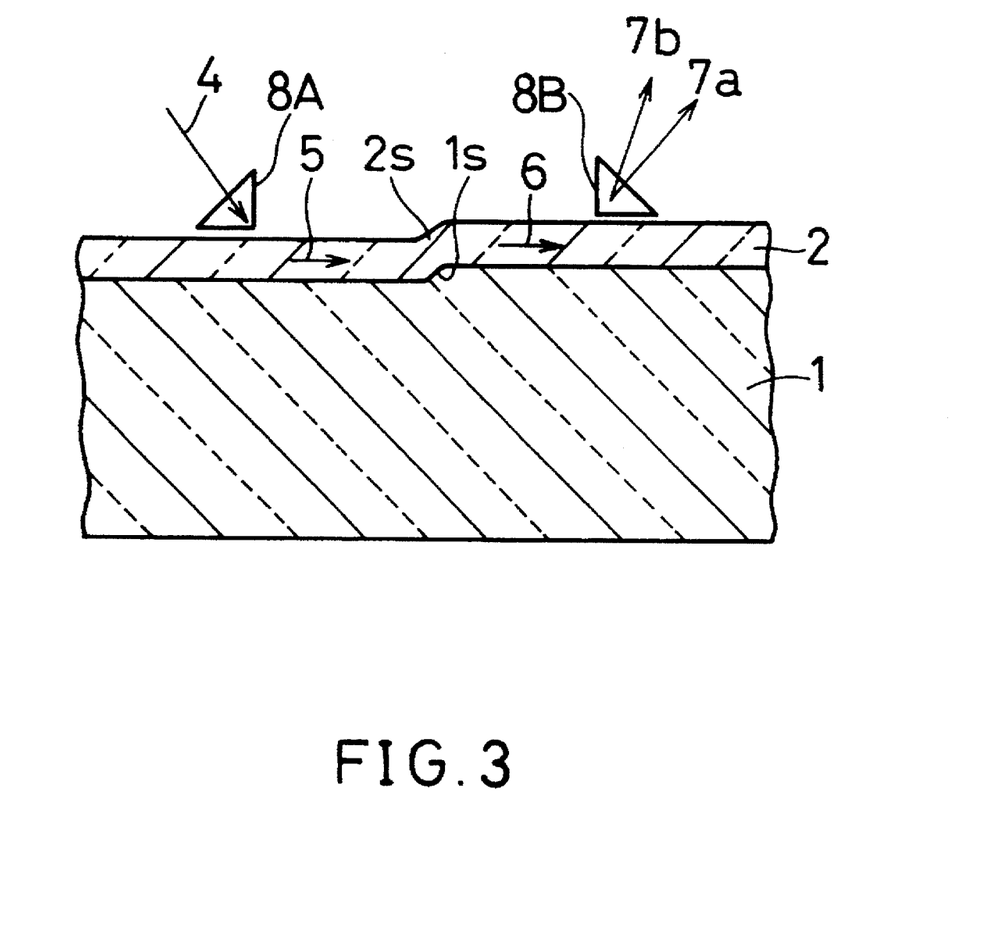
FIG. 3 is a cross-sectional view showing a light beam splitting apparatus according to another embodiment of the present invention using prism couplers.

In the first embodiment of the present invention, the input and output of a beam into a waveguide layer was performed by using a line grating coupler. However, it is also possible to apply a curved or a pitch-modulated grating coupler or other input-output media. For example, FIG. 3 is an example using the prism couplers 8A and 8B as the input-output media, whereby exactly the same effect can be achieved as in the first embodiment. Naturally, it is also possible to use a prism coupler as an input medium and a grating coupler as an output medium, or the other way around. The result remains exactly the same as in the first embodiment. In addition, it was described in the first embodiment that the incident beam 4 can generate a guided wave in TE mode, but it may well be a TM mode or a mode higher than zero-order mode. Similarly, it was configured that the guided wave is radiated in zero-order, first-order and secondary mode, but higher modes can also be radiated.

EXAMPLE 2

Figure 4:
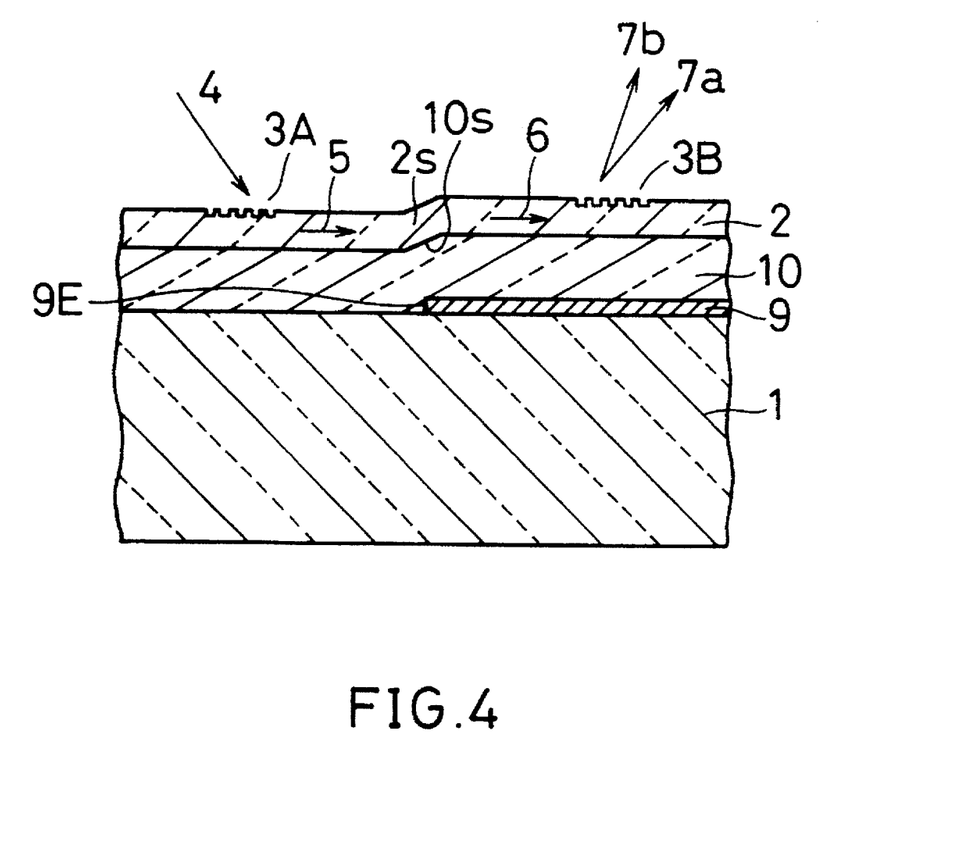
FIG. 4 is a cross-sectional view showing a light beam splitting apparatus according to the second embodiment of the present invention.

FIG. 4 is a light beam splitting apparatus showing the process of forming a gentle step-wise structure in the second embodiment of the present invention. Since the difference between this embodiment and the first embodiment exists only in formation of the step-wise structure, the explanation is limited to this part only. The rest is omitted since it is identical to the first embodiment. Referring to FIG. 4, reference numeral 1 denotes a transparent substrate such as quartz or glass; 9, a step layer comprising metals such as nichel-chrome or aluminum; 10, a buffer layer such as $SiO_2$; 2, a waveguide layer. For instance, the preferred thickness of the buffer layer is about 1 μm. The terminal portion 9E of the step layer 9 is located between two grating couplers 3A and 3B. The existence of this step layer 9 makes the buffer layer 10 to bend step-wise. 10s, the step-wise structure of the boundary between the waveguide layer 2 and the buffer layer 10, forms a gentle slope. As a result, 2s, the step-wise structure of the waveguide 2, also forms a gentle slope. As shown in the second embodiment, the step-wise structure 2s forms a more gentle curve compared to the first embodiment, thereby controlling the guided wave to lose its quantity at the step-wise structure. This example also has the advantage of adjusting the form of the step-wise structure 2s by controlling the thickness of the buffer layer 10. Since step layer 9 has no specific conditions regarding its form, it can be formed easily by using a conventional etching method. Thus, this method is a great improvement over the prior art, as mentioned in the first embodiment.

EXAMPLE 3

Figure 5:
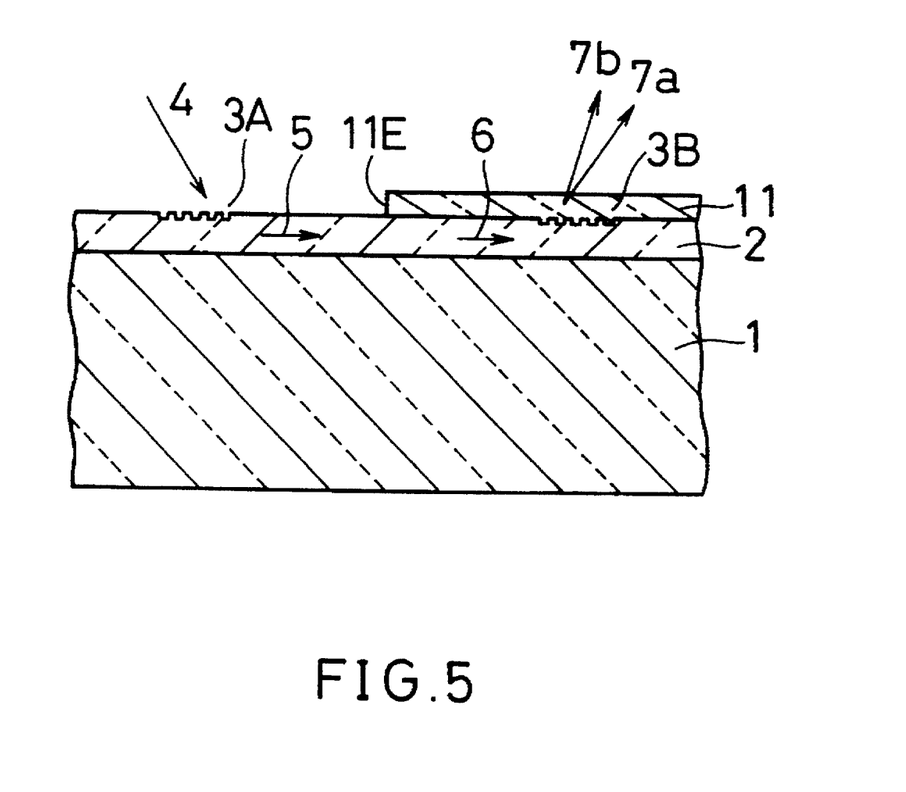
FIG. 5 is a cross-sectional view showing a light beam splitting apparatus according to a third embodiment of the present invention.

FIG. 5 is a light beam splitting apparatus showing the process of generating a guided wave having a different waveguide mode in the third embodiment of the present invention. Since the difference between this embodiment and the first embodiment exists only in the structure in which a guided wave having a different waveguide mode is generated, the explanation is limited to this part only. The rest is omitted since it is identical to the first embodiment. Referring to FIG. 5, reference numeral 1 denotes a transparent substrate; 2, a waveguide layer; 11, a loading layer formed on a waveguide layer. The terminal portion 11E of the loading layer 11 is located between grating couplers 3A and 3B. The guided wave 5 in single mode is deflected by passing adjacent to 11E and turns into the guided wave 6 including several modes. As a result, the mode transfer can be attained easily in the third embodiment as well, in which two beam having different radiant angles 7a and 7b can be generated according to the same principle applied in the first embodiment.

EXAMPLE 4

Figure 6:
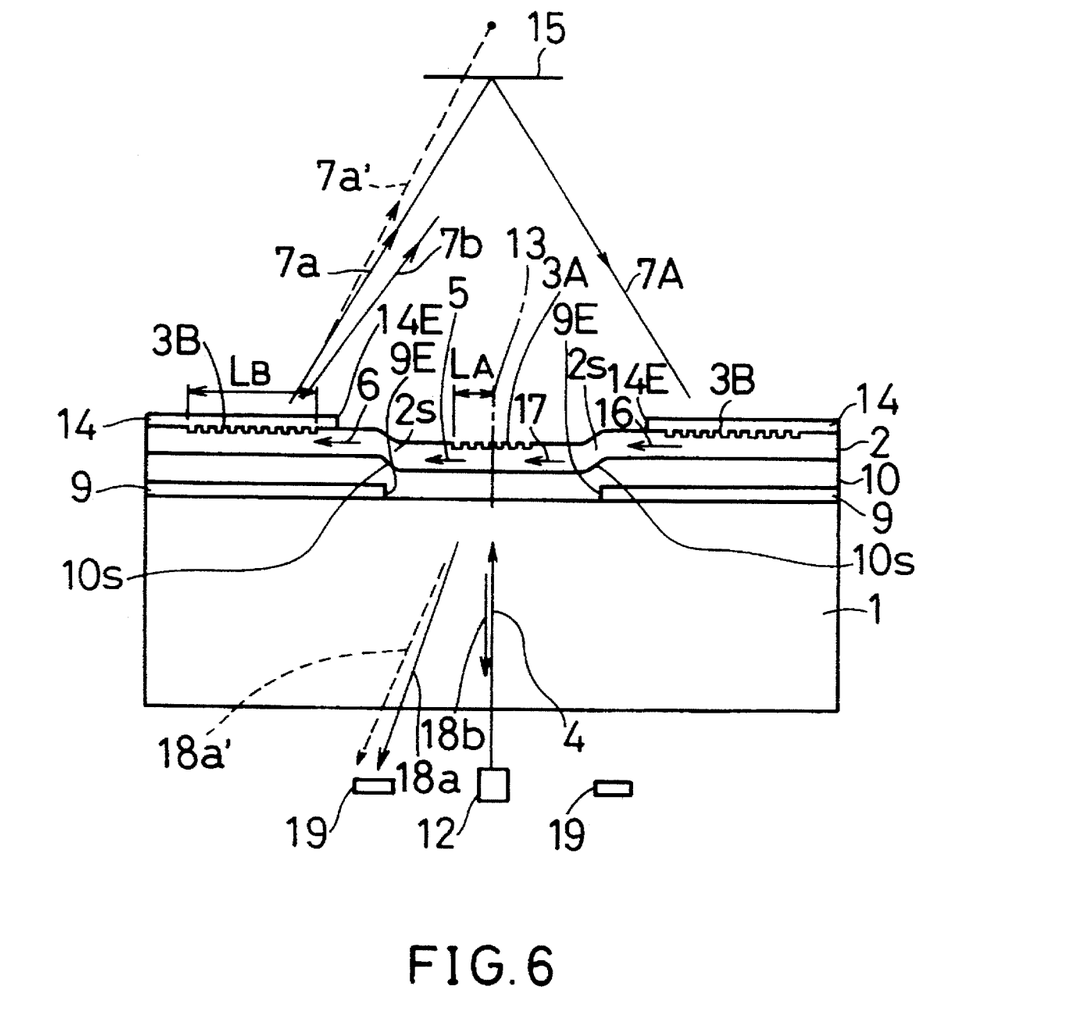
FIG. 6 is a cross-sectional view showing an optical disk apparatus according to a fourth embodiment of the present invention.

FIG. 6 is the fourth embodiment of the present invention showing the structure of an optical disk apparatus in which the light beam splitting apparatus in the second embodiment is applied. Referring to FIG. 6, reference numeral 1 denotes a transparent substrate; 9, a step layer made of metal; 10, a buffer layer; 2, a waveguide layer; 3A, a coupler in the form of a concentric-circular grating (concentric-circular grating coupler); 3B, a coupler formed of a concentric-circular grating which has a focusing function owing to a modulation of grating pitch; 14, a loading layer formed on the concentric-circular focusing grating coupler 3B. In the present embodiment, the entire structure forms a rotational symmetry against a central axis 13, and the gratings of couplers 3A and 3B are also concentric against the central axis 13. 9E and 14E, terminal portions on the side of internal circumference of the step layer 9 and the loading layer 14, are orbicular against the central axis 13, and a light detector 19 is also placed in rotational symmetry. The existence of step layer 9 makes the buffer layer 10 bend step-wise. 10s, a step-wise structure of the boundary between the waveguide layer 2 and the buffer layer 10, forms a gentle slope. As a result, 2s, a step-wise structure of the waveguide layer 2, forms a gentle slope as well. When the grating pitch of the coupler 3A is set properly according to Formula 1 (applying θ=0 and the equivalent refraction index for the first-order mode guided wave), a guided wave 5 in first-order mode can be generated by a laser beam 4 which is radiated from a semi-conductor laser 12 and moves along the axis 13 entering vertically into the coupler 3A. The guided wave 5 is deflected by passing through the step-wise structure 2s and turns into a guided wave 6 including both zero-order and first-order mode. The guided wave 6 is most likely to be in a zero-order mode, especially when the thickness of the waveguide layer is set adjacent to the cut-off of first-order mode, since zero-order mode guided wave is stable against the disturbance compared to first-order mode guided wave (referring to Table 2, the ratio of being a zero-order beam is 96% under the condition of thickness Arrow C). The light radiated from the grating coupler 3B is transferred to a radiant light 7a from the zero-order mode of the guided wave 6 and to a radiant light 7b from the first-order mode of the guided wave 6. The pitch of the grating coupler 3B is properly modulated, so that the radiant beam 7a is focused on one point. When the signal plane 15 of an optical disk is placed in this focusing position, the reflected light beam 7A on this plane enters into the grating coupler 3B again, generating the guided wave 16 in zero-order mode which moves toward the center. The guided wave 16 is deflected by passing through a step structure 2s and turns into a guided wave 17 including both zero-order mode and first-order mode. Again, the guided wave 17 is most likely to be in a zero-order mode, when the thickness of the waveguide layer is set adjacent to the cut-off of first-order mode, since zero-mode is stable against the disturbance compared to first-order mode (referring to Table 2, the ratio of being a zero-order beam is 81% under the condition of thickness Arrow C). The light 17 radiated from the grating coupler 3A is transferred to a radiant beam 18a from the zero-order mode of the guided wave 17 and to a radiant beam 18b from the first-order mode of the guided light 17. The radiant beam 18b moves along the axis 13 (in the opposite direction to the incident beam 4), and the radiant beam 18a moves along the direction of a conical surface created by a certain angle against the axis 13. The light detector 19 is placed in the direction of an incident beam which generates the zero-order mode guided wave at the grating coupler 3A. Therefore, the radiant beam 18a can be detected.

The step layer 9 made of metal is placed there to form the step-wise structure 2s of the waveguide layer 2, but it is also effective in preventing a streak beam or other disturbing beams from entering into the detector 19. In addition, the step layer reflects the element radiated from the grating coupler 3B toward the transparent substrate 1 side, thereby strengthening the intensity of the radiant beam 7a headed for the optical disk. The objective of the buffer layer 10 is not only to form the gentle step-wise structure 2s, but it is also effective in dissociating the waveguide layer 2 from the metallic step layer 9, and therefore, preventing the loss of the guided wave. It is not the objective of the loading layer 14 to transfer modes as explained in the third embodiment of the present invention. In this case, the loading layer is placed there to decrease the radiation decay factor of the grating coupler 3B (the degree which shows the easiness of the guided wave to be radiated). In other words, when the coupling length $L_B$ of the grating coupler 3B is designed to be longer than the coupling length $L_A$ of the grating coupler 3A, the radiation decay factor of the coupler 3B should be smaller than that of the coupler 3A in order to generate a radiant beam along the entire coupling length of the coupler 3B. If the grating couplers 3A and 3B are formed simultaneously by etching the surface, the depth of the gratings will be the same and the radiation decay factor of the couplers will be almost equal. However, if the loading layer 14 is formed on the grating coupler 3B as in the present embodiment, the radiation decay factor of the coupler 3B can be made smaller by making the depth of gratings equivalently shallow. Naturally, if it is possible to divide the processes of forming 3A and 3B and the grating of the coupler 3B can be made shallower than that of 3A, the radiation decay factor of the coupler 3B can be also made smaller than that of 3A without using the loading layer 14.

FIG. 6 describes one direction on a cross-sectional plane, but the same principles apply in all directions since everything occurs in rotational symmetry about axis 13. Actually, it is necessary to convert the laser beam 4 entering the grating coupler 3A into a circular-tangential polarized light or into a circular-normal polarized light (a polarized light whose electric vector is set in the direction tangent or normal to the circle). The radiant beam 7a from the grating coupler 3B should also be converted into a straight polarized light. The explanation relating to these conversions is omitted in this embodiment since these methods are widely known among those skilled in the art. In the above-noted embodiment, the guided wave 5 in first-order mode was generated from the laser beam 4 entering the grating coupler 3A, and a light detector was placed in the direction of an incident beam which generates a zero-order mode guided wave. It is also possible to generate the guided wave 5 in zero-order mode or in other mode and to place an optical detector 19 in the direction of an incident light generating a guided wave in first-order or other mode. By applying a light beam splitting apparatus shown in the second embodiment of the present invention, a compact optical disk apparatus can be constructed in a simple structure as shown in the above-noted embodiment.

EXAMPLE 5

Figure 7:
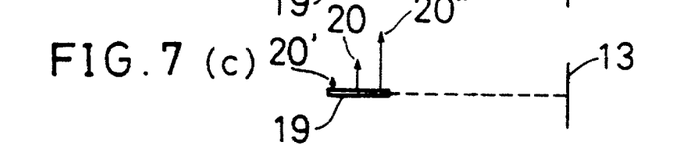
FIGS. 7(a)–7(e) are drawings explaining the principles of detecting focus error signals according to the fourth embodiment of the present invention.

Generally, a laser beam contains a certain range of wavelengths, usually of an extremely small range. It is possible to use this extremely small wavelength difference in detecting a focus error signal on the signal plane of an optical disk. FIGS. 7(a)–7(e) are drawings explaining the principle of detecting focus error signals on the signal plane 15 of an optical disk in the FIG. 6 of the above-noted fourth embodiment. If the wavelength of the laser beam 4 becomes shorter, the angle of beam radiated from the grating coupler 3B changes from 7a to 7a' as shown in FIG. 6 and the angle of the beam radiated from the grating coupler 3A changes from 18a to 18a' In the same way, if the wavelength becomes longer, the radiant angle changes in reverse. In FIG. 7(e), 7a, 7a' and 7a" correspond respectively to beams radiated from the grating coupler 3B which change in accordance with the wavelengths of the laser beam 4: $\lambda_o$, $\lambda_o-d\lambda$, and $\lambda_o+d\lambda$. 20, 20' and 20" show the intensity and the position of each light detected at the optical detector 19 in correspondence to the wavelengths of the laser beam 4: $\lambda_o$, $\lambda_o-d\lambda$ and $\lambda_o+d\lambda$. Compared with 20, 20' exists further from the central axis 13 since the wavelength of 20' is shorter than that of 20. On the other hand, 20" exists closer to the central axis 13 than 20 because of its longer wavelength, as compared with 20. FIG. 7(a) shows an example where the signal plane of the optical disk is positioned in the focusing point 15 of the radiant beam 7a, whereby the light intensity 20 according to the wavelength $\lambda_o$ is at the highest. The reason why the light intensities 20' and 20" are lower than that of 20 is that the radiant beams 7a' and 7a" enter into the signal plane 15 of the optical disk in a disfocused condition, and therefore, when the reflective beams return to the grating coupler 3B, the quantity of the coupled guided wave decreases, since it is not conditioned to generate a guided wave any more. The same applies to FIG. 7(b), in which the signal plane of the optical disk is positioned in the focusing point 15' of the radiant beam 7a', and that the light intensity 20' in accordance to the wavelength $\lambda_o-d\lambda$ is at the highest. FIG. 7(c) shows an example where the signal plane of the optical disk is positioned in the focusing point 15" of the radiant beam 7a", whereby the light intensity 20" according to the wavelength $\lambda_o+d\lambda$ is at the highest. Thus the disfocus on the signal plane of the optical disk is reflected in the changing distribution of light intensity detected by the optical detector. Accordingly, if the optical detector 19 is cut in two parts by a circle surrounding the axis 13, it is possible to detect the focus error signals on the signal plane of the optical disk by measuring and comparing the quantity of light detected on the inside field 19P and the outside field 19M. This principle of detection is effective in light sources with a stable wavelength, for example a gas laser. FIG. 7 shows an example of the optical detector 19 in fan shape, but it may also have a shape of an annulus ring or even of a divided annulus ring.

The light beam splitting apparatus of the present invention enables with its simple structure to diverge a light beam effectively and to give options in divergence by optimizing the thickness of a waveguide layer. In addition, the apparatus has the advantage of being produced easily by a conventional etching method. Furthermore, by applying a light beam splitting apparatus of the present invention, it is possible to construct a compact optical disk apparatus comprising a simple structure and to detect focus error signals easily.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

We claim:

1. A light beam splitting apparatus comprising a transparent waveguide layer, an input medium which guides a laser beam radiated from a laser light source into the waveguide layer and generates a first guided wave having a first wave mode and being transmitted through the waveguide layer, and an output medium which radiates the guided wave transmitted through the waveguide layer toward outside, wherein said waveguide layer is actually step-wise bent at a portion between the input and the output media over a step structure having a differential height, such that a part of the first guided wave changes to a second guided wave having a different wave mode by passing through said step-wise bent portion, so that, the two guided waves will be radiated from the output medium in two different directions.

2. A light beam splitting apparatus according to claim 1, wherein said differential height of said step structure ranges between 30 to 60% of the thickness of the waveguide layer.

3. A light beam splitting apparatus according to claim 1, further comprising a buffer layer formed upon a substrate having a step-wise structure on a surface, and wherein said waveguide layer is formed on top of said buffer layer, thereby forming a gentle slope.

4. A light beam splitting apparatus according to claim 1, wherein said output medium is formed in a periodic structure at a boundary face of said waveguide layer.

5. A light beam splitting apparatus according to claim 1, wherein said output medium is formed of a triangular prism placed adjacent to said waveguide layer.

6. A light beam splitting apparatus according to claim 1, wherein said output medium is formed in a periodic uneven structure at a boundary face of the waveguide layer, one of said guided waves radiated from the output medium is focused and reflected at a signal face of an optical disk apparatus, the reflected beam enters into the output medium and generates a third guided wave which is transmitted through the waveguide layer toward the input medium, said third beam is radiated from the input medium outside of the waveguide layer, and an optical detector is placed outside the waveguide layer to detect the radiant beam.

7. A light beam splitting apparatus according to claim 6, wherein said laser beam enters vertically into the input medium, and said input medium, said step-wise structure and the output medium are formed in rotational symmetry about an optical axis, to form an optical disk apparatus.

8. A light beam splitting apparatus according to claim 6, wherein the incident beam into the input medium generates the first-order mode guided wave, and wherein an optical detector is placed in the direction of the incident beam which generates a zero-order mode guided wave.

9. A light beam splitting apparatus according to claim 7, wherein an optical detecting medium is shaped either as a fan or as an annulus ring about an incident axis, said optical detecting medium is cut into an inside field and an outside field symmetrically about the incident axis, and a differential light quantity detected at the inside and outside fields is used to determine a focus error at the signal face of the optical disk.

10. A light beam splitting apparatus comprising a transparent waveguide layer, a second transparent layer adjoining the waveguide layer, an input medium which guides a laser beam radiated from a laser light source into the waveguide layer and generates a first guided wave transmitted through the waveguide layer, and an output medium which radiates said guided wave transmitted through the waveguide layer toward the outside, wherein a terminal portion of the second transparent layer is formed between the input and the output media, a part of the first guided wave changes to a second guided wave having a different wave mode by passing adjacent to the terminal portion, so that the first and second guided waves will be radiated from the output medium in two different directions.

11. A light beam splitting apparatus according to claim 10, wherein said output medium is formed in a periodic structure at a boundary face of the waveguide layer.

12. A light beam splitting apparatus according to claim 10, wherein said output medium is formed of a triangular prism placed adjacent to the waveguide layer.

13. A light beam splitting apparatus according to claim 10, wherein said output medium is formed in a periodic uneven structure at a boundary face of the waveguide layer, a light beam radiated from the output medium is focused and reflected at a signal face of an optical disk apparatus, the reflected beam enters into the output medium and generates a third guided wave which is transmitted through the waveguide layer toward the input medium, the third guided wave is radiated from the input medium outside of the waveguide layer, and an optical detector is placed outside the waveguide layer to detect the radiant beam.

14. A light beam splitting apparatus according to claim 13, wherein the laser beam enters vertically into the input medium, and said input medium, said terminal portion of the second transparent layer and the output medium are formed in rotational symmetry about an optical axis, to form an optical disk apparatus.

15. A light beam splitting apparatus according to claim 13, wherein the incident beam into the input medium generates the first-order mode guided wave, and wherein an optical detector is placed in the direction of the incident beam which generates a zero-order mode guided wave.

16. A light beam splitting apparatus according to claim 15, wherein an optical detecting medium is shaped either as a fan or as a annulus ring about an incident axis, said optical detecting medium is symmetrically cut into an inside field and an outside field by a circle about the incident axis, and a differential light quantity detected at the inside and outside fields is used to determine a focus error at the signal face of the optical disk.

* * * * *